US008761795B2

(12) United States Patent
Stargardt et al.

(10) Patent No.: US 8,761,795 B2
(45) Date of Patent: Jun. 24, 2014

(54) DYNAMIC REVERSE GEOFENCING

(75) Inventors: Wayne Stargardt, Dallas, TX (US); Jeffrey O. Smith, Dallas, TX (US)

(73) Assignee: Numerex Corp., Atlanta, GA (US)

( * ) Notice: Subject to any disclaimer, the term of this patent is extended or adjusted under 35 U.S.C. 154(b) by 6 days.

(21) Appl. No.: 13/607,955

(22) Filed: Sep. 10, 2012

(65) Prior Publication Data
US 2013/0244687 A1  Sep. 19, 2013

Related U.S. Application Data

(60) Provisional application No. 61/532,891, filed on Sep. 9, 2011.

(51) Int. Cl.
*G01S 5/02* (2010.01)
*H04W 4/02* (2009.01)

(52) U.S. Cl.
CPC ............. *H04W 4/021* (2013.01); *G01S 5/0252* (2013.01); *G01S 5/0278* (2013.01)
USPC .................................. 455/456.1; 340/539.13

(58) Field of Classification Search
USPC ............... 342/357.07; 455/456.1; 340/539.13
See application file for complete search history.

(56) References Cited

U.S. PATENT DOCUMENTS

| 2008/0188236 | A1 | 8/2008 | Alles et al. | |
| 2009/0309789 | A1* | 12/2009 | Verechtchiagine | 342/357.07 |
| 2011/0256881 | A1* | 10/2011 | Huang et al. | 455/456.1 |

FOREIGN PATENT DOCUMENTS

WO   2008/127159 A1   10/2008

* cited by examiner

*Primary Examiner* — Myron K Wyche
(74) *Attorney, Agent, or Firm* — Bell Nunnally & Martin LLP; Craig J. Cox

(57) ABSTRACT

A system and method for determination the relative location of a mobile object is described that includes building a database of known/expected locations with the exact longitude and latitude for each location. Next, an estimated location for a mobile object is generated using information from the cellular network and an area boundary is defined around the mobile object that defines, with some probability, where the object is actually located. The known locations in the database that fall within the area boundary are then identified and a relative probability is calculated for each known location that indicates its relative likelihood of where the mobile object is actually located. From this information at least the most probable location of the mobile object is determined along with a measure of estimation confidence.

17 Claims, 5 Drawing Sheets

DYNAMIC REVERSE GEOFENCING

CROSS REFERENCE TO RELATED INFORMATION

This application claims the benefit of U.S. Provisional No. 61/532,891, filed Sep. 9, 2011 titled "Dynamic Reverse Geofencing".

TECHNICAL FIELD

The present disclosure is directed to determining the location of a mobile device and more particularly to using known object locations and cellular location service to determine the location of the mobile device.

BACKGROUND OF THE INVENTION

Geofencing is a technique used in wireless location-based services to identify an area of interest that will be used to evaluate whether a mobile object is located at the area of interest. Used traditionally, a geofence is a contiguous boundary enclosing an area. The geofence boundary can be stored either within the mobile object or within a central application that can communicate wirelessly with the mobile object. In the traditional geofence technique, the mobile object determines its approximate position using GPS, and then compares that position to a set of defined geofences, and also compares that position to a previously determined position. Depending on the specific application, application events occur depending on how the mobile object relates to a geofence: 1) move from outside a geofence in the previous location report to inside a geofence in the current location report; 2) move from inside a geofence to outside it; 3) stay within a geofence in which it was also previously located. Geofencing is used extensively in vehicle tracking and fleet management applications to track when vehicles leave one location and arrive at a destination, and to assure that a vehicle remains at an authorized location. As traditionally used, geofencing relies on the relatively accurate and relatively stable locations provided by GPS.

BRIEF SUMMARY OF THE INVENTION

A system and method for determination the relative location of an object is described. In a preferred embodiment, the system and method includes building a database of known/expected locations, with the exact longitude and latitude for each location. The system and method then generate an estimated location for a mobile object using information from the cellular network, for which the estimation error is generally much larger than that provided by OPS-based locations. The system and method then define an area boundary around the mobile object that defines, with sonic probability, where the object is actually located, and identify the known locations in the database that fall within the area boundary Once the known locations are identified, a relative probability for each known location is calculated that indicates its relative likelihood of where the mobile object is actually located, and at least the most probable location of the mobile object is provided along with a measure of estimation confidence.

In another preferred embodiment, a method of determining the relative location of a mobile object is described. The method includes generating an estimated location for the mobile object using a location determination mechanism, and defining a reverse geofence boundary around the estimated location of the mobile object, the reverse geofence boundary defining an area where the mobile object is located. The method then identifies a set of known locations within the reverse geofence boundary from a database of known locations, and calculates a relative probability for each known location in the set of known locations that indicates a relative likelihood of where the mobile object is actually located. The most probable location of the mobile object is determined based on the calculations.

In yet another preferred embodiment, a system for determining the location of a mobile object is described. The system includes at least one mobile object, each mobile object including one or more location determination mechanisms producing an estimated location for the at least one mobile unit, and a data center in communication with one mobile object and operable to receive the estimated location from the mobile object. The data center is then operable to define a reverse geofence boundary around the estimated location of the at least one mobile object. The data center then identifies a set of known locations within the reverse geofence boundary from a database of known locations, and calculates a relative probability for each known location in the set of known locations that indicates a relative likelihood of where the at least one mobile object is actually located. The most probable location of the mobile object is then determined based on the calculations.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization, and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

The concepts described herein describe a system and method that addresses a set of asset tracking and monitoring applications in which the estimated position is not provided by GPS, but rather is provided by information solely from the interaction of the mobile device with the cellular communications network. The location estimation error using these techniques is typically very large (often 1,000 s of meters) and potentially very unstable (i.e., large variations in reported position from one estimation to another for a stationary object). The typical application needed in these situations is primarily to determine that a mobile object is probably at the location where it is expected to be, or not (i.e., that a shipping container is still at the warehouse to which it was shipped).

Figure 1A:
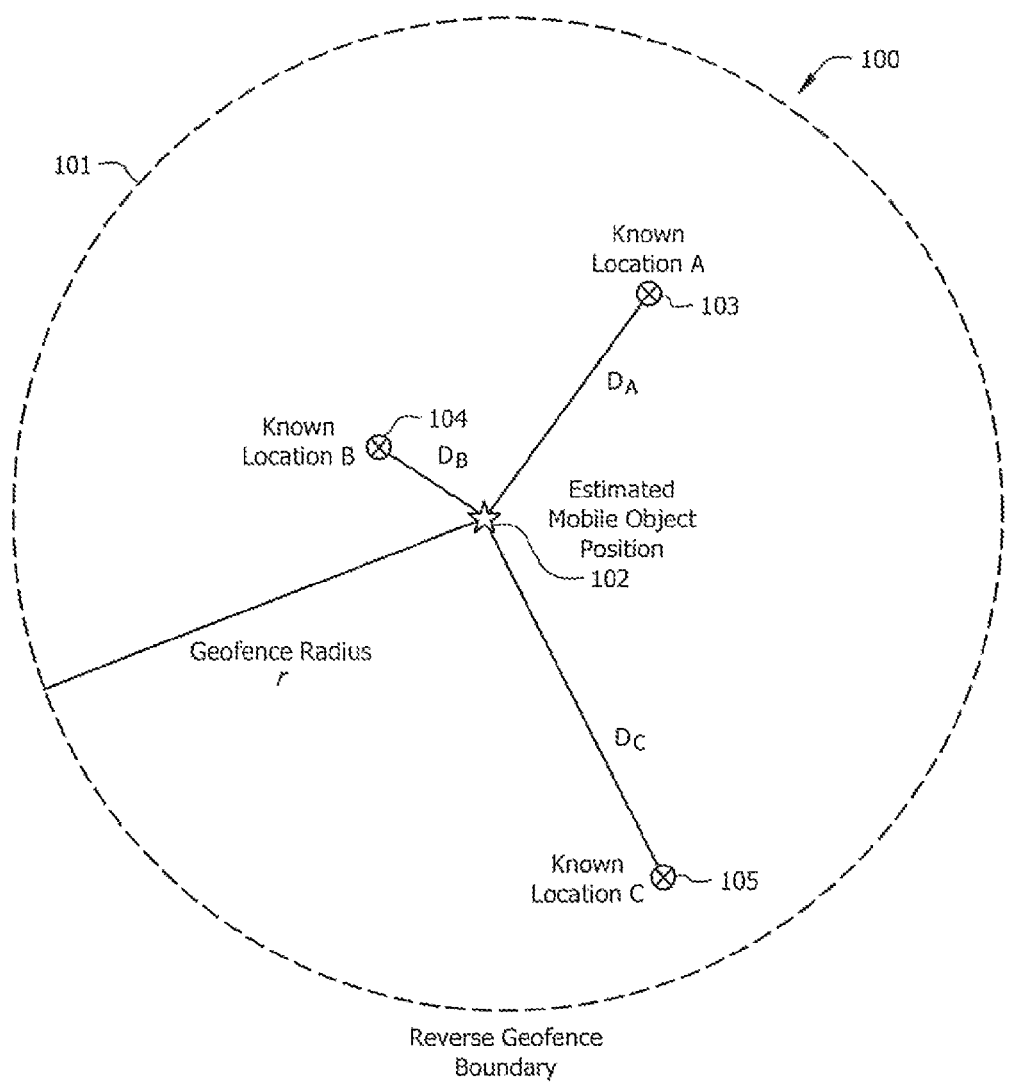
FIG. 1A is a diagram illustrating the operation of an embodiment of a location determination system and method according to the concepts described herein.
Figure 1B:
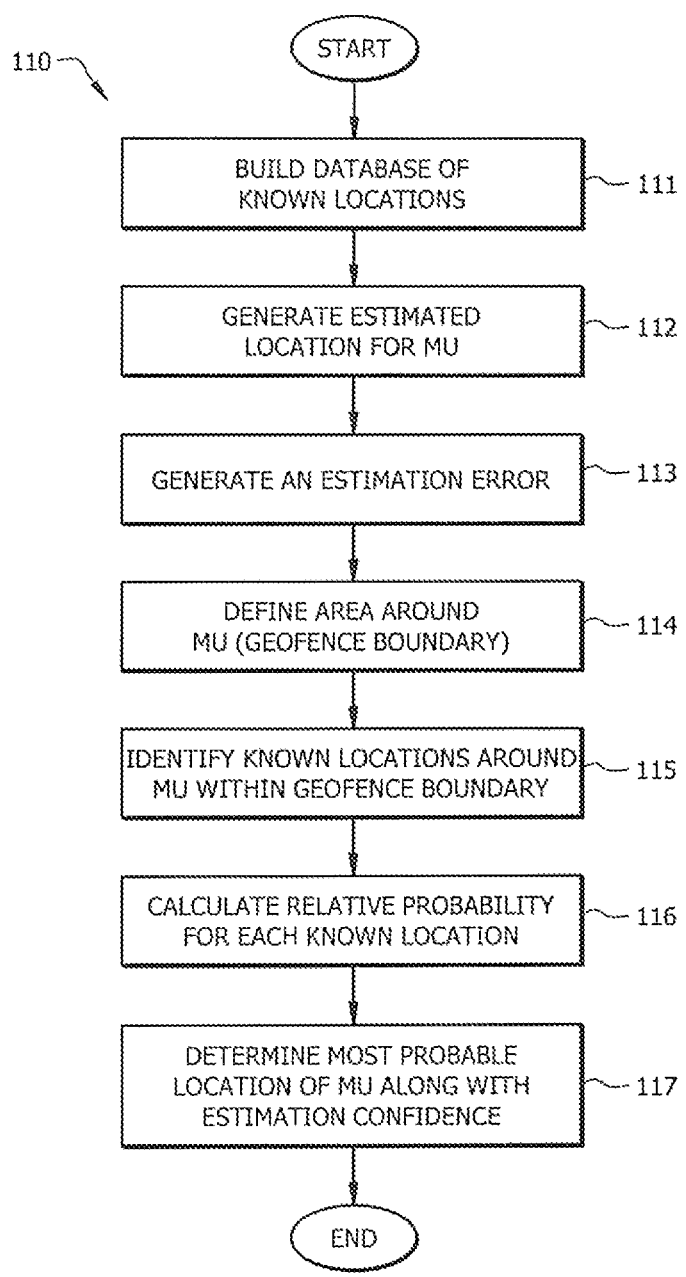
FIG. 1B is a flow chart of a method for determining the location of a mobile device according to the concepts described herein.

Referring now to FIGS. 1A and 1B, an embodiment of a system and method for estimating the location of an object 102 is described. The system and method describe a position estimation technique 100 and method 110 that in a preferred embodiment includes the following actions:

- Build a database 111 of known/expected locations 103, 104, 105, with the exact longitude and latitude for each location;
- Generate an estimated location 112 for a mobile object 102 using information from the cellular network;
- Generate an estimation error 113, in radial distance, from the specific estimation error metric provided by the cellular network along with the estimated location itself;
- Define an area 114 around the mobile object that defines, with some probability, where the object is actually located (i.e., termed the "reverse geofence" 101);
- Identify 115 the known locations 103, 104, 105 in the database that fall within the reverse geofence boundary 101;
- Calculate a relative probability 116 for each known location that indicates its relative likelihood of where the mobile object 102 is actually located; and
- Provide at least the most probable location 117 of the mobile object along with a measure of estimation confidence.

Calculating the reverse geofence 101, as is described in the "define an area around the mobile object action is, in preferred embodiments, very similar to calculating, the Circular Error Probability for the estimated position of the mobile object. In the preferred embodiment, the reverse geofence 101 is a circular area with radius r, in which $r=f(\sqrt{P})$, where P is the probability of the mobile object being inside the reverse geofence. The reverse geofence boundary can be calculated for each reported estimation of mobile object position based on the requirements of each application and on the accuracy metric provided for that estimation by the cellular network locating process (i.e., the reverse geofence 101 can be determined dynamically). The specific accuracy metric (i.e., the specific measure for P) is different for each cellular network locating process, so a separate calculating function $r=f(\sqrt{P})$, is used for each cellular network locating process for converting P, in its network-specific form, into a standard radius r, in feet, for the Circular Error Probability.

The action of calculating a relative probability among multiple potential known locations within the reverse geofence can be done for multiple possible locations—1, 2, ..., n. The relative probability of any one location Px is $$Px = 1 - \frac{Dx^2}{D1^2 + D2^2 + \cdots + Dn^2},$$

Where Dx is the radial distance of the estimated position of the mobile object from known location x. In the case in which only one known location is within the reverse geofence 101, the calculation reduces to the trivial expression $$Px=1$$

For the case when no known locations lie within the reverse geofence 101, a similar calculation can be used to estimate a probability that the mobile object may actually be at a known location that is outside the calculated reverse geofence but is "close" (in a statistical measure). In this case, the probability that the mobile object is actually at the closest known location is calculated by $$Px = f\left(\frac{r^2}{Dx^2}\right)$$

Using, network-based location services in machine-to-machine (M2M) applications is relatively new since network-based location services are themselves a new and evolving technology. There are relatively few applications which use these low accuracy services for asset tracking, particularly to try to identify whether a mobile asset or object is in an expected location. To the extent that existing, application-specific solutions use network-based location services and attempt to match mobile objects to expected locations, they simply select the nearest expected location to the reported position (i.e., use location with the lowest Dx).

This technique for estimating whether a mobile object is at a known location can actually be used when the estimated location is derived from a highly accurate technology, such as GPS. Applying this technique with GPS-derived locations results in a very small reverse geofence, and in these cases the location with the lowest Dx is usually the obvious best choice when Dx is small relative to the size of r.

This technique uses a more statistically based method to identify the population of possible expected locations where an asset could be located, as well as to rate quantitatively how likely the nearest location is to be the actual location of the mobile object. This method also provides a mechanism for identifying and ranking the situation in which multiple known locations could be the actual location, which is likely given the low accuracy (and large reverse geofence radius) that result from using network-based location services.

Figure 2:
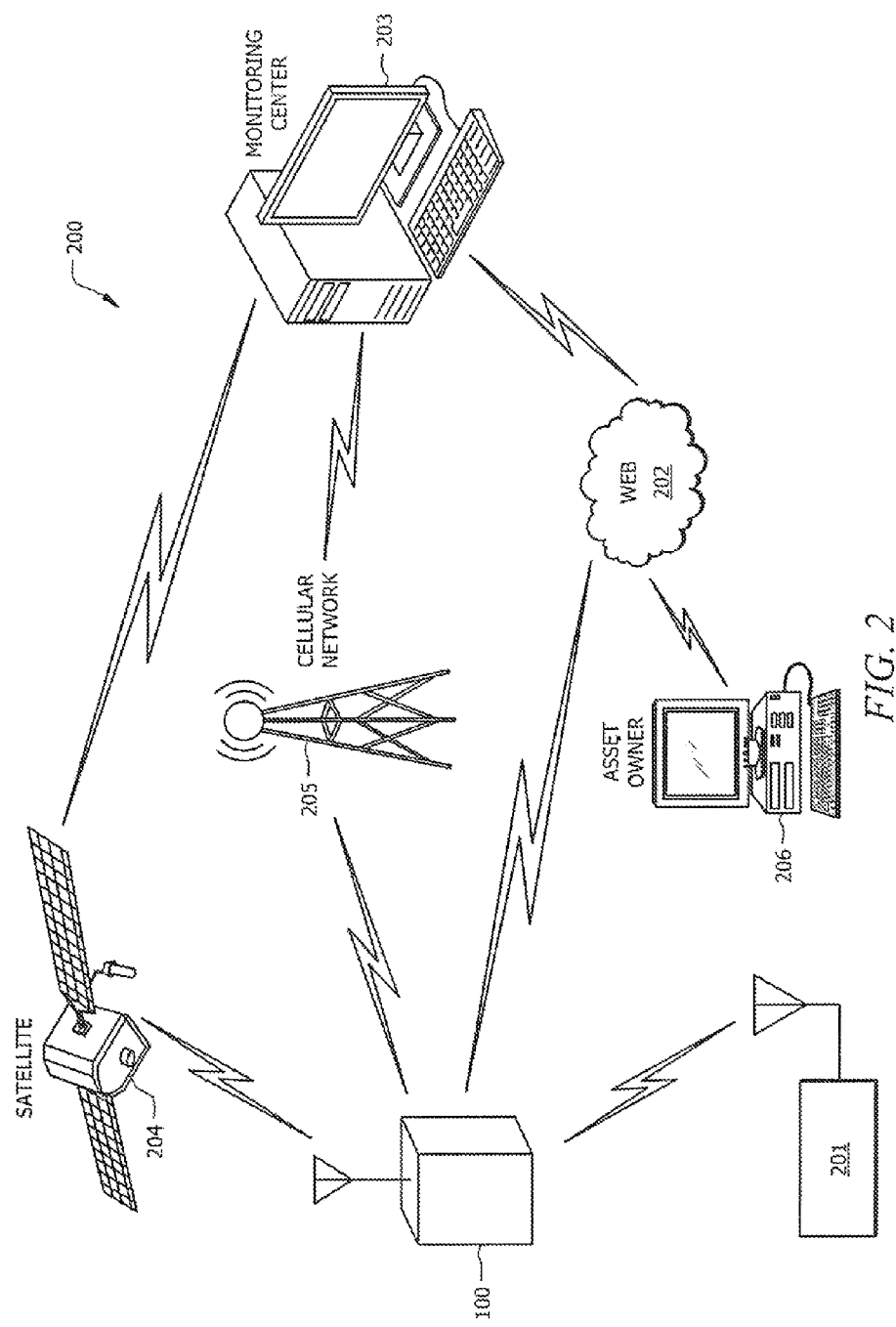
FIG. 2 is a block diagram of an embodiment of a system for location determination and reporting according to the concepts described herein.

Referring now to FIG. 2, an embodiment of a system for monitoring a mobile object according to the concepts described herein is shown. The mobile object 210 includes electronics capable of communicating with one or more types of networks. In certain embodiments, the mobile object 210 or its associated electronics module would be able to receive ORS signals from satellite network 204 where they are available and send its location coordinates to a data center 203 using the cellular network 205, satellite communications, or other communications protocol. As described with reference to FIG. 1, if the mobile object cannot receive the GPS signals or does not have GPS capabilities, then it could use location based services using cellular network 205 according to the concepts described herein.

In addition to location detection capabilities, mobile object 210 has the appropriate electronics to communicate with a data center, or monitoring center, 203. The data center 203 receives the location information from the mobile object 210 using any type of appropriate communications network, such as satellite network 204, cellular network 205, or data network 202. Using the appropriate communications network, the mobile object 210 is able to communicate its location, or an approximation thereof, and status. The owner, or service provider, of the mobile object 210, asset owner 206, can retrieve location status and other data from data center 203 using a data network 202 connection.

Figure 3:
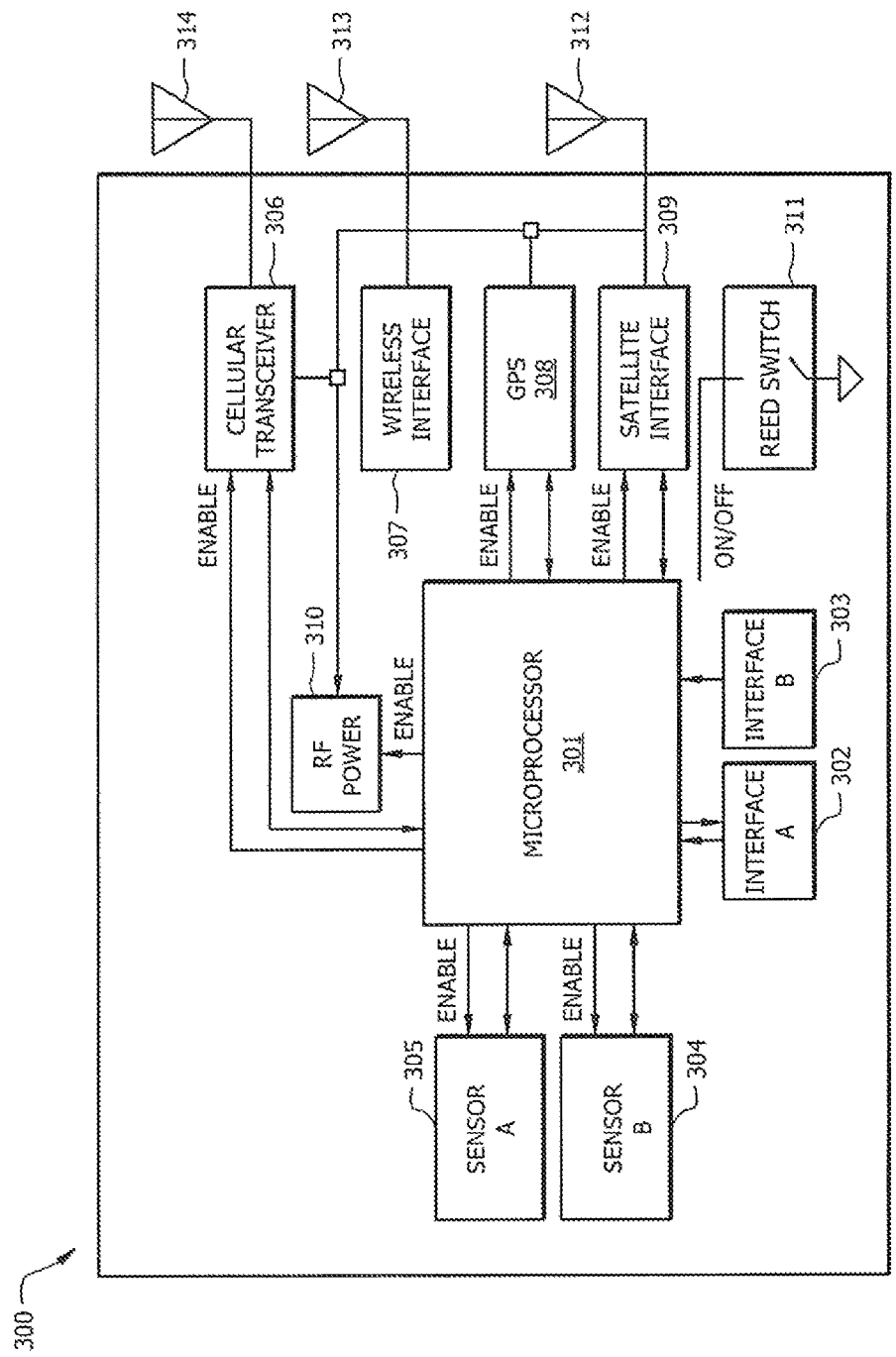
FIG. 3 is a block diagram of an embodiment of an electronics module for use in location determination and reporting according to the concepts described herein.

Referring now to FIG. 3, a preferred embodiment of an electronics module for use with a mobile object according to the concepts described herein is shown. The module 300 includes a microprocessor 301 programmable to execute desired instructions and to control the operation of module 300. The processor 301 may have internal memory capable of storing data and programming information or may use memory external to the microprocessor. The module 300 also includes a cellular transceiver 306 and associated cellular antenna 314 to perform cellular communications. Power for the cellular transceiver is supplied by RF power module 310. The module 300 may also include a satellite location determination device 308, which can be GPS or satellite service based, and a satellite interface 309, which can be a transmitter, receiver or transceiver, which uses satellite antenna 312. Wireless interface 307 controls communication with wireless data networks, such as will or bluetooth, using antenna 313.

Interfaces 302 and 303 allow for interaction with the module through a physical connector, input device, wireless interface or other mechanism to interact directly with the mobile object. Sensors 304 and 305 can be any type of sensor that is used to collect data by module including sensors to detect environment conditions around the module, contact sensors, vibration sensors, motion sensors, short range radar sensors, or other type of sensor that can be used to detect information of interest. Other sensors can also be included that detect other mobile object attributes or environmental information. Such information can be collected and reported to the data center or can also be used to trigger actions by the mobile device. Reed switch is an electrical switch that is activated by a magnetic field and can be used to enable or disable the device.

The location and status information of the mobile object can be periodically reported to a monitoring center, either at regular intervals or upon the occurrence of a particular event. Embodiments of the mobile object can also be programmed to receive information from the monitoring center, such as software and program updates.

Figure 4:
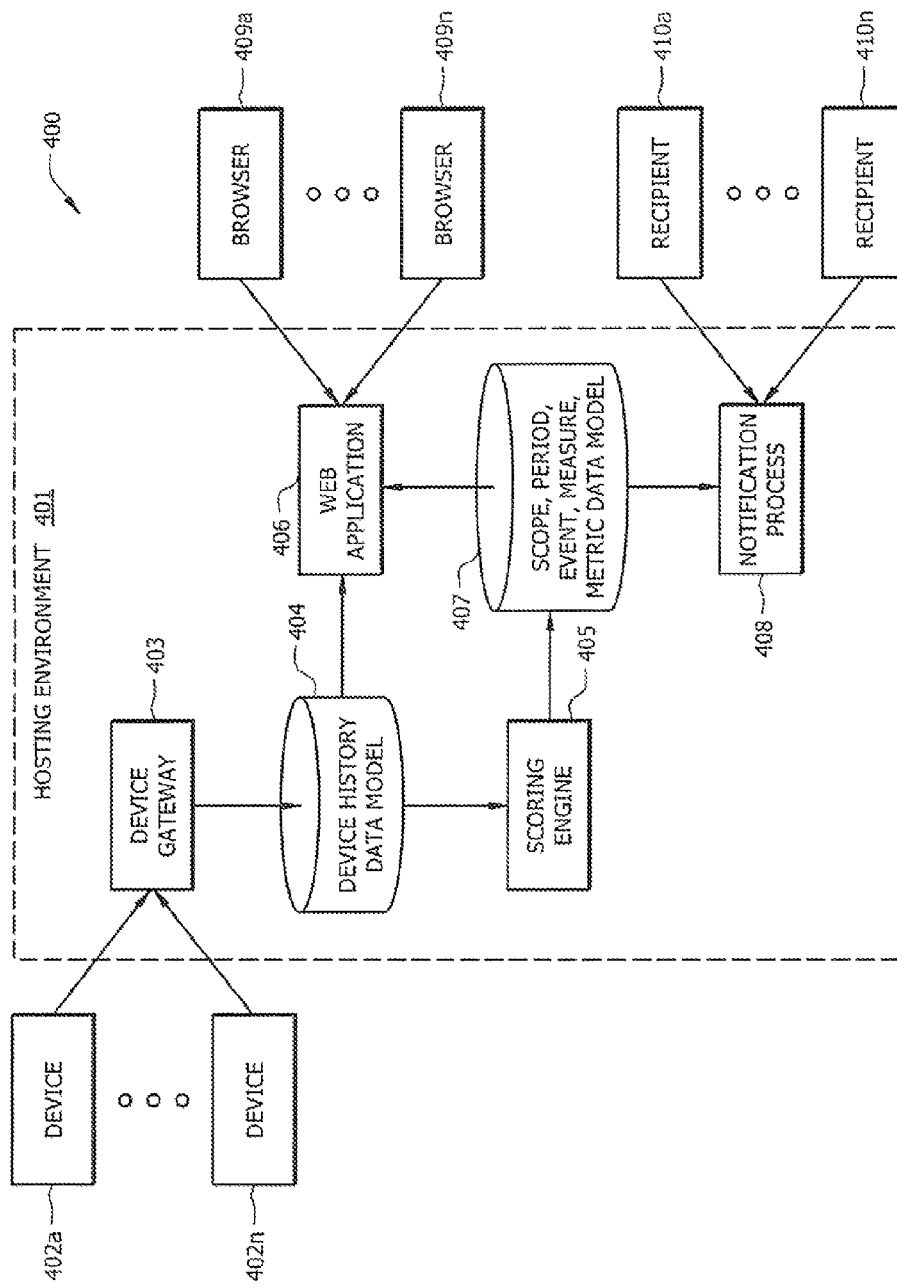
FIG. 4 is a block diagram of an embodiment of an analytical engine used to implement the location determination system and method described herein.

Referring now to FIG. 4 an embodiment of an analytical engine 401 that can be used with the location determination, or reverse geofence, system 100 and method 110 from FIGS. 1A and 1B described herein is shown. System 400 includes the analytical engine 401. A device communications gateway 403 in analytical engine 401 is operable to receive messages from remote devices 402a-402n over various communications networks, which can include low earth orbit (LOE) satellite (for example, OrbitOne/GlobalStar), GPRS or radio frequency (RF) wireless networks, and/or general IP networks (such as the Internet). The gateway 403 parses messages based on device/network type to extract encoded data that can be unique for each of the devices. This can include any type of information and may include location information such as latitude/longitude where the device was located when the data was collected.

A device history data model 404 maintains the population of devices that can report data, including the network over which it can communicate and its unique identity on that network. The device history data model 404 also maintains a history of readings received from each device and maintains properties for each device. The device history data model 404 receives readings queued up by the gateway 403 for availability to the scoring engine 405. The scoring engine also maintains in a database a set of "device measures," 407 each device measure utilized to capture customizable aggregate statistics of data from all readings for each device for a specific period start and duration. This data is collected for all "scorable" devices and is independent of any scope.

The scoring engine 405 is operable to processes readings for all devices 402a-402n to create device measures and in the case of the location determination technique described herein can be used to perform the calculations and analysis described above. The scoring engine 405 also can be used to maintain a set of scope/device notification policies 408. These notification policies 408 can contain customizable information about what kind of notification, typically an email sent to a recipient, or recipients, 410a-410n interested in a particular score or in the case of the location determination described herein, an alert with the location of the remote device, or an alert when the remote device is not where it is expected to be.

Additionally, analytical engine 401 includes a web application 406 that provides a portal for users to log into system 400 and view information concerning the remote devices, such as location, the information collected from the remote device or to push information or programming to the remote devices. The users interact with web application 406 using standard browser interfaces 409a-409n.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of determining the relative location of a mobile object, the method comprising:

generating an estimated location for the mobile object using a location determination mechanism;

defining a reverse geofence boundary around the estimated location of the mobile object, the reverse geofence boundary defining an area where the mobile object is located;

identifying a set of known locations within the reverse geofence boundary from a database of known locations;

calculating a relative probability for each known location in the set of known locations that indicates a relative likelihood of where the mobile object is actually located; and determining the most probable location of the mobile object based on the calculations.

2. The method of claim 1 further comprising with determining the most probable location, determining an estimation of confidence in the most probable location.

3. The method of claim 1 further comprising building a database of known/expected locations with the exact longitude and latitude for each location.

4. The method of claim 1 wherein the reverse geofence boundary is a circular area with radius r, in which $r=f(\sqrt{P})$, where P is the probability of the mobile object being inside the reverse geofence boundary.

5. The method of claim 1 wherein the location determination mechanism is a cellular location service.

6. The method of claim 1 wherein the location determination mechanism is GPS.

7. The method of claim 1 wherein the reverse geofence boundary is determined in part from an accuracy metric provided by the location determination mechanism.

8. A system for determining the location of a mobile object, the system comprising:
- at least one mobile object, each of the at least one mobile objects including one or more location determination mechanisms, wherein the location determination mechanism produces an estimated location for the at least one mobile unit; and
- a data center in communication with each of the at least one mobile objects and operable to receive the estimated location from the at least one mobile object;
- wherein the data center is operable to:
  - define a reverse geofence boundary around the estimated location of the at least one mobile object, the reverse geofence boundary defining an area where the at least one mobile object is located;
  - identify a set of known locations within the reverse geofence boundary from a database of known locations;
  - calculate a relative probability for each known location in the set of known locations that indicates a relative likelihood of where the at least one mobile object is actually located; and
  - determine the most probable location of the at least one mobile object based on the calculations.

9. The method of claim 8 further comprising with determining the most probable location, determining an estimation of confidence in the most probable location.

10. The method of claim 8 further comprising building a database of known/expected locations with the exact longitude and latitude for each location, 11. The method of claim S wherein the reverse geofence boundary is a circular area with radius r, in which $r=f(\sqrt{P})$, Where P is the probability of the mobile object being inside the reverse geofence boundary.

12. The method of claim 8 wherein the location determination mechanism is a cellular location service.

13. The method of claim 8 wherein the location determination mechanism is OPS.

14. The method of claim 8 wherein the reverse geofence boundary is determined in part from an accuracy metric provided by the location determination mechanism.

15. A method for determining the relative location of an object comprising:
- building a database of known/expected locations with the exact longitude and latitude for each location;
- generating an estimated location for a mobile object using information from the cellular network;
- defining an area boundary around the mobile object that defines, with some probability, where the object is actually located;
- identifying the known locations in the database that fall within the area boundary;
- calculating a relative probability for each known location that falls within the area boundary that indicates its relative likelihood of where the mobile object is actually located; and
- determining at least the most probable location of the mobile object along with a measure of estimation confidence.

16. The method of claim 15 wherein the area boundary is a circular area with radius r, in which $r=f(\sqrt{P})$, where P is the probability of the mobile object being inside the area boundary.

17. The method of claim 15 wherein the area boundary is determined in part from an accuracy metric provided by the location determination mechanism.

* * * * *